Patented Aug. 22, 1950

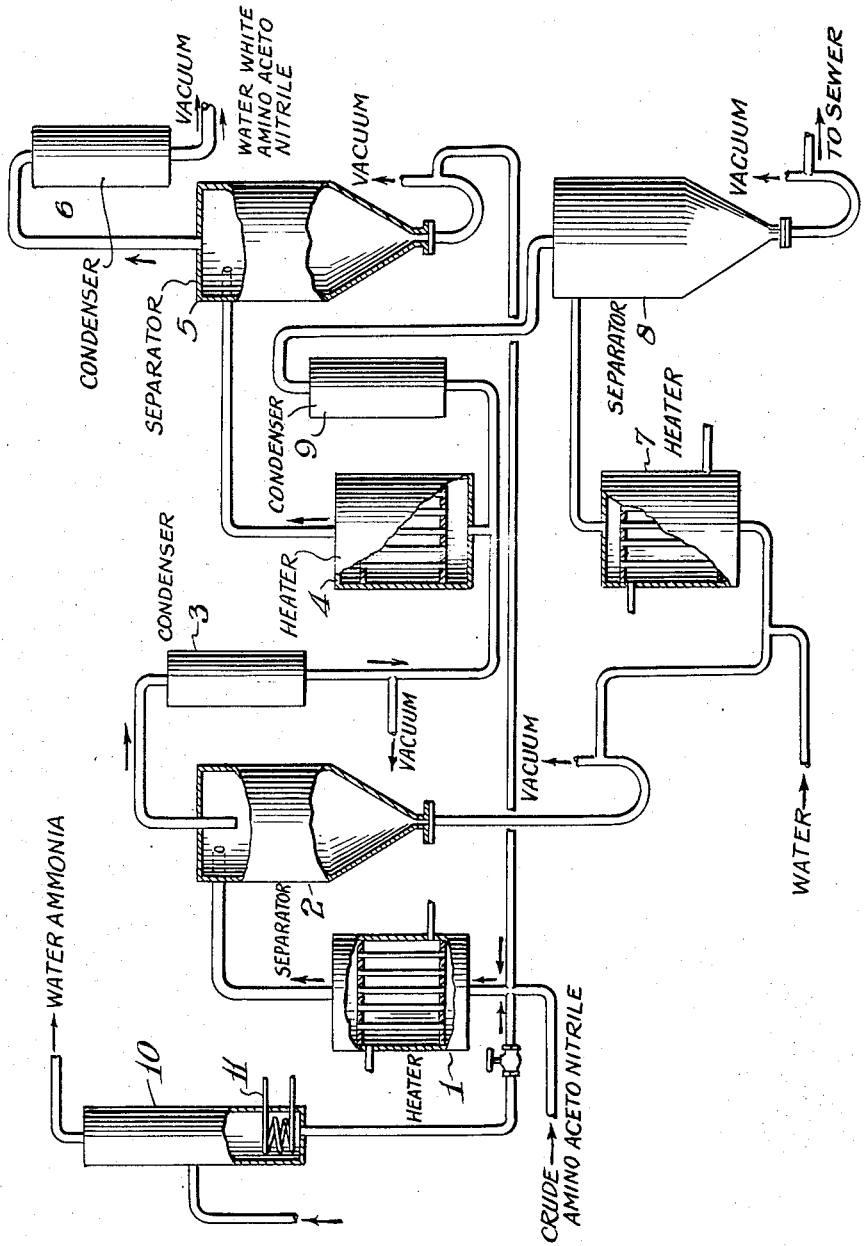

2,519,803

UNITED STATES PATENT OFFICE 2,519,803

PREPARATION OF ETHYLENE DIAMINES

Arthur George Weber and Clarence D. Bell, Wilmington, Del., assignors to E. I. du Pont de Nemours & Company, Wilmington, Del., a corporation of Delaware Application February 5, 1946, Serial No. 645,654

1 Claim. (Cl. 260—583)

This invention relates to a process for the preparation of ethylene diamine and more particularly to its preparation from the amination products of formaldehyde cyanhydrin.

A number of processes have been proposed for the preparation of ethylene diamine but they all have been laboratory processes of only academic interest. It has been prepared by heating ethylene halides with alcoholic ammonia; by the reduction of ethylene dinitrile with metallic sodium in alcoholic soluton; by converting esters of dibasic acids of the oxalic acid series to the hydrazide, thereafter converting the hydrazide to the azide and thru the dicarbamate to the amine (J. Pr., 91 (11) 1 (1915)); and by the catalytic hydrogenation of aliphatic nitriles using palladium or nickel catalyst (Ber. 56, 1988). None of these methods of the art, however, produce ethylene diamine by a practical commercial process.

An object of the present invention is to provide a commercial process for the preparation of ethylene diamine. Another object is to provide an overall process for the preparation of ethylene diamine by the hydrogenation of a partially purified aqueous reaction mixture resulting from the amination of formaldehyde cyanhydrin. Yet another object is to provide an overall process for the preparation of ethylene diamine from formaldehyde cyanhydrin with exceptional yields. Other objects and advantages of the invention will hereinafter appear.

The overall process of this invention involves amination of formaldehyde cyanhydrin, partial purification of an aqueous solution of the products of amination and hydrogenation of the resulting purified products to give ethylene diamine.

An intermediate product made in the aforesaid overall process is aminoacetonitrile. Aminoacetonitrile is under normal conditions especially unstable. It decomposes upon standing at room temperature and often decomposes with explosive violence when heated. Any reaction therefore involving this nitrile and requiring sustained heating results in decomposition. Moreover, no practical process is known wherein aminoacetonitrile can be recovered from a dilute solution of it without serious decomposition. In accordance with this process, the aminoacetonitrile is not separated completely from the amination products of the formaldehyde cyanhydrin reaction.

Because inter alia of the highly unstable nature of aminoacetonitrile, any materials prepared from the pure nitrile would be very expensive and consequently in a search for a basic raw material from which to prepare ethylene diamine, this nitrile would be avoided because of its high cost. In spite of these considerations, applicants have provided by means of careful research the first commercially acceptable process for the preparation of ethylene diamine from processes involving aminoacetonitrile in spite of the unstable nature of the nitrile.

If aminoacetonitrile is prepared, purified and then hydrogenated to ethylene diamine, so much of the aminoacetonitrile is lost during the purification step that the cost of the resulting ethylene diamine made the process wholly uneconomical. Applicants, however, made the surprising discovery that if instead of using pure aminoacetonitrile they employed the partially purified reaction product from the amination of formaldehyde cyanhydrin, they were able to obtain an excellent conversion of the aminoacetonitrile to ethylene diamine. By this route they developed a commercially acceptable process for the preparation of ethylene diamine in which by eliminating the step of completely purifying the aminoacetonitrile, the step which results in unconscionable losses of aminoacetonitrile, they were able to provide an overall process which has resulted in the commercial production of ethylene diamine.

Furthermore, they found that even their partially purified aminoacetonitrile must be fresh when hydrogenated, the nitrile being preferably hydrogenated directly after partial purification. Storage developed contaminants that prevented satisfactory hydrogenation and it was found that while a product stored for one day at 5° C. would hydrogenate, difficulties in operation could be expected. Preferably, therefore, a storage or hold-up between partial purification and hydrogenation of not appreciably more than four hours at 5° C. should be allowed. If the temperature during the hold-up is higher, say in the proximity of room temperature or above, a relatively shorter period should be specified.

In accord with the first step of the invention formaldehyde cyanhydrin (hydroxyacetonitrile) is reacted with ammonia. The ammonia is added to the cyanhydrin in an aqueous or alcoholic solution and in accord with the art the aminoacetonitrile may be obtained in normal theoretical yield. No description has been found in the art, however, describing how the aminoacetonitrile is recovered from the crude reaction mixture, and while the reaction mixture may, on analysis, show theoretical yields, such a showing has no real significance for the crude mixture is not aminoacetonitrile but only contains a relatively small percentage of it.

Applicants have found that the crude reaction mixture from the amination of formaldehyde cyanhydrin can, however, be partially purified without substantial decomposition of the aminoacetonitrile so that the resulting mixture, with its potentially available nitrile, can be subjected to a hydrogenation reaction with a substantially quantitative conversion of the aminoacetonitrile to ethylene diamine. The partial purification of the formaldehyde cyanhydrin crude reaction product is accomplished by subjecting it to a series of operations which involve heating the aqueous solution to vaporize the water and the major portion of the aminoacetonitrile, and substantially immediately thereafter separating the unvaporized liquids present from the vapors of aminoacetonitrile and water. More specifically this is done by continuously subjecting a stream of the crude product to a heating step which rapidly vaporizes the water and most of the aminoacetonitrile, leaving the other constituents present in the liquid phase. The mixture of liquid and vapor is passed from the heating step substantially as rapidly as the vapor is formed into liquid-vapor separator of the separation step. If desired, the vapors may be condensed, again heated and separated in a second series of operations similar to the first. The liquids and/or vapors separated in the first or second series of operations may be subsequently treated in a similar manner to effect complete separation.

A principal feature of this phase of the process involves passing a relatively small volume as, for example, a stream of the crude reaction mixture into a heater, wherein the liquid is rapidly heated. This can be accomplished by heating a portion of a tube through which the liquid is passing. As the mixture is vaporized, it increases the volume of the materials in the tube, and accordingly greatly increases the flow through the tube. From the heating tube the vapor-liquid mixture passes to a chamber in which the vapors and liquids are separated, inasmuch as aminoacetonitrile decomposes rapidly at elevated temperatures in both the liquid and vapor phase and, moreover, as the amount of aminoacetonitrile decomposing in the refining system increases both as the time of heating is increased and as the boiling point of the liquid in the heater is raised, the length of time required to vaporize the crude mixture should be as short as possible and the vaporization should be carried out at as low a pressure as practical.

The process is more readily visualized by reference to the accompanying drawing which diagrammatically illustrates the process.

A crude reaction mixture obtained directly from the amination of formaldehyde cyanhydrin containing aminoacetonitrile, water, and other products of the reaction is introduced into the heater 1, within which the mixture is heated sufficiently to vaporize all of the water and most of the aminoacetonitrile. The resulting mixture of liquid and vapor passes tangentially into the separator 2, which is similar in construction to a cyclone separator, the liquid being discharged from the bottom, the vapors from the top. The vapors contained a substantial proportion of the aminoacetonitrile and water are liquefied in the condenser 3, are passed on to a second heater 4 and a second separator 5, wherein the same series of processes effected in the first stage is carried out. The vapors from the second stage pass into the condenser 6, from which the liquid product is passed to hydrogenation. The liquid from separator 5 may, if desired, be returned as indicated in the drawing to the first stage to recover its aminoacetonitrile content, while the liquid from separator 2 is passed into a third stage illustrated by heater 7, wherein the liquid is also heated to vaporize the aminoacetonitrile, and the liquid and vapors separated in separator 8. Prior to being introduced into this stage, water is added before heating in order to aid in the separation. The vapor from the third stage is liquefied in condenser 9 and the condensate preferably returned to the second stage for further refining. The arrangement of the flows between the various heaters and condensers may be varied to suit the operating conditions. For example, the vapor from the third separator 8 may be condensed and introduced to the first heater 1 instead of the second heater 4, or the liquid from the second separator 5 may be introduced to the third heater 7 instead of the first heater 1. When there is not much surging in the first heater 1, this heater with separator 2 may give excellent quality aminoacetonitrile without further treatment. In this case, the vapor from the first separator 2 is collected as product without further treatment and the vapor from the third separator 8 is condensed and either added to the product or recycled to the first heater 1.

When purifying the crude reaction mixture from the amination of formaldehyde cyanhydrin, some ammonia is present, which may, if desired, be separated by evaporation before the mixture is introduced into the purifying units of this invention. The crude reaction mixture, free from solids and containing less than 10% ammonia, is introduced into the system of heaters, separators, and condensers which are maintained at the lowest possible pressure allowing steady flow of materials through the system. For example, it has been found desirable to effect the separation in the first two stages at a pressure of about 20 to about 80 mm. and at a temperature between about 65° C. and about 95° C., and the separation in the third stage at a pressure of about 5 to about 30 mm. and a temperature between about 55° and about 95° C. The water content of the crude reaction mixture by and large governs the optimum conditions. Adequate heating is provided by jacketing the heating zones with 2–15 pounds per square inch of steam or by other means giving an external temperature of about 110° C.

More specifically, the above process may be conducted in the equipment described by introducing into the system as illustrated in the drawing 5.1 parts per hour of a crude reaction mixture obtained from the amination of formaldehyde cyanhydrin. To this mixture, 0.75 part per hour of condensed vapors from the second stage of the reaction, e. g., from separator 5 is added, and the resulting composite mixture introduced into the heater 1, wherein it is heated to a temperature between 65 and 95° C. under a pressure of approximately 40 mm. provided by any suitable means. From this heater the vapor-liquid mixture is introduced directly into the cyclone separator 2, which is maintained at substantially the same pressure. Approximately 3.06 parts per hour of vapors issue from this separator, are liquefied in condenser 3 and are passed to the second stage of the process together with 3.19 parts per hour of condensed vapor from condenser 9, wherein they are subjected to substantially the same conditions to which they were subjected in the first stage. The vapors from the second stage are removed at a rate of approximately 5.5 parts per hour, are condensed at 6 and withdrawn from the system as a water-white aqueous solution of aminoacetonitrile. The liquid from separator 5 constituting approximately 0.75 part per hour is returned to the heater 1 of the first stage. The liquid from the first stage constituting approximately 2.59 parts per hour is introduced, after the addition of 1 (although from 0.25 to 3 parts may be added if desired) part of water per hour, into heater 7 of the third stage, and from the separator 8 of this stage 3.19 parts per hour of the vapors are withdrawn and returned after condensation at 9 to heater 4 of the second stage. Approximately 0.4 part per hour of liquid is discharged from the third stage and, if desired, may be treated for the small amount of aminoacetonitrile retained therein.

A preferred embodiment of the purification step of the invention is illustrated by this example in which parts are by weight unless otherwise indicated.

The crude reaction mixture, containing about equal parts of ammonia and aminoacetonitrile in a mixture of contaminating products, obtained by the amination of substantially equimolar weights of formaldehyde cyanhydrin in water, is heated to about 70° C. at atmospheric pressure to drive off most of the ammonia. The resulting liquid contains about 5% ammonia and is cooled to from 5 to 10° C., filtered and then fed at the rate of about 0.75 foot per minute to the first of three separation stages.

Each heating section consists of a jacketed stainless steel tubular heater 6' in length and ½" I. D. followed by a 5" I. D. x 8" long cyclone separator. The time of contact in the heaters of each stage is less than 6 minutes and is preferably less than 3 minutes. The vapor from the first stage is condensed and fed to a second stage similar to the first. The liquid from the first stage is fed to a third stage along with 0.08 lb. of water per pound of the crude nitrile introduced to the refining system. The vapor from the third stage is condensed and fed to the second, while the liquid is run to waste. The vapor from the second stage is condensed and sent to hydrogenation and the liquid is recycled to the first separation stage. The operating conditions are:

| Cyclone Separator | Feed | Pressure mm. Hg | Vapor Temp., °C. |
|---|---|---|---|
| 2 [1] | Crude aminoacetonitrile and No. 5 liquid | 40 | 75 |
| 5 [1] | Condensed vapor from 2 and 8 | 40 | 72 |
| 8 [1] | Liquid from 2 and water | 15–25 | 80 |

[1] Numerals refer to corresponding separators in the drawing.

The pressure and temperature in the heater of each stage is substantially the same as the respective pressure and temperature in the cyclone separator of that stage. The condensed vapors from the second stage gives an aqueous solution of a pure water-white aminoacetonitrile.

This reaction product which may contain from 25 to 75% aminoacetonitrile, the remainder being predominantly water, and for preferred hydrogenation in the order of from 55 to 70% aminoacetonitrile is passed with as little hold-up as possible directly into a hydrogenation converter.

The hydrogenation is conducted preferably in a cartridge-type converter, the partially purified aqueous solution of aminoacetonitrile being introduced into the reaction zone together with ammonia, the hydrogenation being conducted at a temperature between 25 and 300° C. and preferably between 85 and 130° C. under pressures above about 100 atmospheres, pressures above 100 atmospheres do not appear to be critical. Suitable hydrogenation catalysts are used and preferably catalysts free from alkali metal and alkaline earth metal oxides, carbonates or the hydroxides. Examples of the catalysts especially suitable are the nickel-aluminum skeleton catalysts, nickel-alloy catalysts, copper chromate and nickel or cobalt catalysts supported or not on kieselguhr, silica gel, or similar inert supports.

The hydrogenation of the partially purified reaction product of the formaldehyde cyanhydrin amination reaction is illustrated in the example in which parts are by weight unless otherwise indicated.

Into a vertically-positioned, stainless-steel cartridge type converter of $2\frac{1}{16}''$ internal diameter and overall length of about 72'', a cobalt catalyst (prepared by the reduction of $\frac{3}{16}''$ cobalt oxide pills with hydrogen at a temperature between 250 and 450° C.) was charged to fill completely the reaction zone. Upwardly through this converter was passed from 50 to 100 cubic fee (STP) of hydrogen and a product purified as described above and containing from 0.25 to 1.5 lbs. of water per lb. of aminoacetonitrile. To this mixture was likewise added approximately 8 lbs. of ammonia per lb. of aminoacetonitrile, the nitrile being passed through the converter at a space velocity of approximately 0.15. The hydrogenation was conducted at 95° C. to 130° C. with a pressure of 300 atmospheres. Operation was continued under these conditions for about 80 hours with excellent conversion of aminoacetonitrile to ethylene diamine (92.5%). At the end of this period of time the nitrile space velocity was increased to between 0.25 and 0.30 with the injection of 6 to 8 lbs. of ammonia per lb. of aminoacetonitrile, other ingredients remaining in the ranges described. Under these conditions the catalyst had a long life and continued to convert the aminoacetonitrile to ethylene diamine at the above high rate.

The aqueous solution of aminoacetonitrile used in the above example was passed directly from the partial purification step with a period between purification and hydrogenation of less than one half hour, the partially purified aminoacetonitrile being cooled to about 5° C. immediately after partial purification.

The hydrogenation may be conducted by introducing a diluent with the crude reaction mixture into the reaction zone. Especially effective are such diluents as ammonia, an alcohol such as methanol, ethanol, normal- or iso-propanol, normal- or iso-butanol or a higher straight or branched chain aliphatic alcohol or any other suitable diluent which is not hydrogenated during the reaction, and which does not react to decompose the aminoacetonitrile being hydrogenated or the ethylene diamine being produced. The diluent should preferably be a solvent for both the aminoacetonitrile and the ethylene diamine and should be present in large excess for example, from 15 to 60 moles of ammonia or alcohol per mole of the aminoacetonitrile content of the crude reaction mixture, with a preferred excess between 20 and 30 moles of the diluent per mole of the aminoacetonitrile.

We claim:

In a process for the preparation of ethylene diamine the steps which comprise aminating aqueous formaldehyde cyanhydrin to aminoacetonitrile, heating the crude amination mixture in water to a temperature between 65 and 95° C. for not more than 3 minutes under a pressure of 5 to 80 mms. until a major portion of the aminoacetonitrile has been vaporized, passing the resulting liquid-vapor mixture into a separating zone and therein separating the aminoacetonitrile vapor from the liquid-vapor mixture, cooling the aminoacetonitrile to about 5° C. and within less than half an hour, subjecting the purified aminoacetonitrile to hydrogenation at a temperature between 25 and 300° C. and a pressure of about 100 atmospheres in the presence of a hydrogenation catalyst.

ARTHUR GEORGE WEBER.
CLARENCE D. BELL.

REFERENCES CITED

The following references are of record in the file of this patent:

UNITED STATES PATENTS

| Number | Name | Date |
| --- | --- | --- |
| 1,239,867 | Blagden | Sept. 11, 1917 |
| 2,053,193 | Guinot | Sept. 1, 1936 |
| 2,069,302 | Dreyfus | Feb. 2, 1937 |
| 2,388,034 | Biggs | Oct. 30, 1945 |

FOREIGN PATENTS

| Number | Country | Date |
| --- | --- | --- |
| 659,771 | Germany | July 30, 1935 |

OTHER REFERENCES

Beilstein: "Handbuch der Org. Chemie," vols. III–IV (4th ed., second supplement), page 676.